United States Patent
Buckles et al.

(10) Patent No.: US 9,687,006 B1
(45) Date of Patent: Jun. 27, 2017

(54) LOIN BACK-RIB AUTO-SAW

(75) Inventors: John K. Buckles, Austin, MN (US);
John T. Hays, Austin, MN (US); Mark Oberbroeckling, Austin, MN (US);
Gary D. Westland, Glenville, MN (US)

(73) Assignee: HORMEL FOODS CORPORATION, Austin, MN (US)

( * ) Notice: Subject to any disclaimer, the term of this patent is extended or adjusted under 35 U.S.C. 154(b) by 1749 days.

(21) Appl. No.: 12/363,173

(22) Filed: Jan. 30, 2009

(51) Int. Cl.
*A22C 17/00* (2006.01)
*A22C 17/02* (2006.01)

(52) U.S. Cl.
CPC ............. *A22C 17/00* (2013.01); *A22C 17/02* (2013.01)

(58) Field of Classification Search
CPC ... A22B 5/0017; A22B 5/0041; A22C 17/004; A22C 17/0046; A22C 17/02; A22C 21/0069
USPC ................ 452/135, 149, 150, 155, 156, 160
See application file for complete search history.

(56) References Cited

U.S. PATENT DOCUMENTS

| | | | |
|---|---|---|---|
| 3,234,591 A | 2/1966 | Vogt et al. | |
| 3,546,737 A * | 12/1970 | Doerfer et al. | 452/157 |
| 3,731,579 A | 5/1973 | Russell | |
| 3,789,456 A * | 2/1974 | Doerfer et al. | 452/157 |
| 4,478,120 A | 10/1984 | Sugimoto | |
| 4,884,318 A * | 12/1989 | Hazenbroek | 452/89 |
| 5,076,124 A | 12/1991 | Whitehouse | |
| 5,295,898 A | 3/1994 | Andre et al. | |
| 5,368,520 A * | 11/1994 | Koch et al. | 452/165 |
| 5,401,207 A * | 3/1995 | Hicks et al. | 452/1 |
| 5,407,384 A * | 4/1995 | Boody et al. | 452/171 |
| 5,580,306 A | 12/1996 | Young et al. | |
| 5,611,727 A * | 3/1997 | Dufour et al. | 452/153 |
| 5,902,177 A * | 5/1999 | Tessier et al. | 452/156 |
| 6,007,416 A * | 12/1999 | Janssen et al. | 452/135 |
| 6,612,920 B1 | 9/2003 | Young | |
| 6,716,097 B2 * | 4/2004 | Freund et al. | 452/149 |
| 6,786,321 B2 * | 9/2004 | Borkiewicz et al. | 198/419.3 |
| 7,001,261 B2 * | 2/2006 | Johnson et al. | 452/150 |
| 7,153,203 B2 * | 12/2006 | Pfarr et al. | 452/150 |
| 7,207,880 B2 | 4/2007 | Bruce et al. | |
| 2003/0220063 A1 * | 11/2003 | Tomcak et al. | 452/177 |
| 2006/0068692 A1 | 3/2006 | Bruce et al. | |

* cited by examiner

*Primary Examiner* — David Parsley
(74) *Attorney, Agent, or Firm* — Dicke, Billig & Czaja, PLLC

(57) ABSTRACT

A rib saw is provided. The saw includes a saw blade, a first rail, a second rail, a sticker chain assembly, a plurality of actuators and a main controller. The first and second rails are configured to guide a shell bone to the saw blade. The sticker chain assembly is configured to move the shell bone along the first and second rails. The plurality of actuators are coupled to move the first and second rails in relation to each other. Moreover, the main controller is configured to control the plurality of actuators to dynamically move the first and second rails while the shell bone is being moved along the first and second rails to achieve a desired rib rack cut with the saw blade.

21 Claims, 14 Drawing Sheets

Linear Profile Calculations

Linear Profile Cut Length: 6.0 Inches

| Shell Bone Pos. | First Rail | | | First Orientation Detection – Second Rail | | | Gap | | |
|---|---|---|---|---|---|---|---|---|---|
| | 14.00 | 0.000 | Linear | 14.00 | 0.000 | Linear | 14.00 | 0.000 | Linear |
| | 14.75 | -0.057 | Linear | 14.75 | 0.112 | Linear | 14.75 | 0.040 | Linear |
| | 15.50 | -0.114 | Linear | 15.50 | 0.225 | Linear | 15.50 | 0.081 | Linear |
| | 16.25 | -0.171 | Linear | 16.25 | 0.337 | Linear | 16.25 | 0.121 | Linear |
| 1.5" | 17.00 | -0.228 | Linear | 17.00 | 0.449 | Linear | 17.00 | 0.161 | Linear |
| | 17.75 | -0.200 | Linear | 17.75 | 0.393 | Linear | 17.75 | 0.122 | Linear |
| | 18.50 | -0.171 | Linear | 18.50 | 0.337 | Linear | 18.50 | 0.089 | Linear |
| | 19.25 | -0.143 | Linear | 19.25 | 0.281 | Linear | 19.25 | 0.061 | Linear |
| 3" | 20.00 | -0.114 | Linear | 20.00 | 0.225 | Linear | 20.00 | 0.039 | Linear |
| | 20.75 | -0.086 | Linear | 20.75 | 0.168 | Linear | 20.75 | 0.022 | Linear |
| | 21.50 | -0.057 | Linear | 21.50 | 0.112 | Linear | 21.50 | 0.010 | Linear |
| 4.5" | 22.25 | -0.030 | Linear | 22.25 | 0.056 | Linear | 22.25 | 0.002 | Linear |
| | 23.00 | -0.030 | Linear | 23.00 | 0.000 | Linear | 23.00 | 0.000 | Linear |
| 6" | 23.75 | -0.030 | Linear | 23.75 | -0.030 | Linear | 23.75 | 0.000 | Linear |
| 7.5" | 24.50 | -0.030 | Linear | 24.50 | -0.030 | Linear | 24.50 | 0.000 | Linear |
| | 25.25 | -0.030 | Linear | 25.25 | -0.030 | Linear | 25.25 | 0.000 | Linear |
| 9" | 26.00 | -0.030 | Linear | 26.00 | -0.030 | Linear | 26.00 | 0.000 | Linear |
| | 26.75 | -0.030 | Linear | 26.75 | -0.030 | Linear | 26.75 | 0.000 | Linear |
| 11.5" | 27.50 | -0.030 | Linear | 27.50 | -0.030 | Linear | 27.50 | 0.000 | Linear |
| | 28.25 | -0.030 | Linear | 28.25 | -0.030 | Linear | 28.25 | 0.000 | Linear |
| 13" | 29.00 | -0.030 | Linear | 29.00 | -0.030 | Linear | 29.00 | 0.000 | Linear |
| | 29.75 | -0.030 | Linear | 29.75 | -0.030 | Linear | 29.75 | 0.000 | Linear |
| 14.5" | 30.50 | -0.002 | Linear | 30.50 | 0.000 | Linear | 30.50 | 0.000 | Linear |
| | 31.25 | 0.000 | Linear | 31.25 | 0.000 | Linear | 31.25 | 0.000 | Linear |
| 16" | 32.00 | 0.000 | Linear | 32.00 | 0.000 | Linear | 32.00 | 0.000 | Linear |
| | 32.75 | 0.000 | Linear | 32.75 | 0.000 | Linear | 32.75 | 0.000 | Linear |
| 17.5" | 33.50 | 0.000 | Linear | 33.50 | 0.000 | Linear | 33.50 | 0.000 | Linear |
| 18.35" | 34.25 | 0.000 | Linear | 34.25 | 0.000 | Linear | 34.25 | 0.000 | Linear |

FIG. 9

LOIN BACK-RIB AUTO-SAW

BACKGROUND

Processing animal carcasses such as pork and beef to produce a rack of ribs (a slab of ribs) requires the cutting of the rack of ribs from a shell bone. A shell bone, as generally referred herein, consist of feather bones, back bones and the ribs. Because of the shape of the shell bone it is difficult to obtain a consistent regular cut of the rack of ribs unless the ribs are cut out of a shell bone by hand. This, however, limits the production rate and increases the cost of production.

For the reasons stated above and for other reasons stated below which will become apparent to those skilled in the art upon reading and understanding the present specification, there is a need in the art for a method and mechanism to cut out a rack of ribs from a shell bone that is fast, efficient and produces consistent cuts with improved yields.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a rib saw is provided. The saw includes a saw blade, a first rail, a second rail, a sticker chain assembly, a plurality of actuators and a main controller. The first and second rails are configured to guide a shell bone to the saw blade. The sticker chain assembly is configured to move the shell bone along the first and second rails. The plurality of actuators are coupled to move the first and second rails in relation to each other and the saw blade. Moreover, the main controller is configured to control the plurality of actuators to dynamically move the first and second rails while the shell bone is being moved along the first and second rails to achieve a desired rib rack cut with the saw blade.

BRIEF DESCRIPTION OF THE DRAWINGS

The present invention can be more easily understood and further advantages and uses thereof more readily apparent, when considered in view of the detailed description and the following figures in which:

FIG. 9, is chart illustrating positions of the first and second rails of one embodiment of the present invention;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a loin back-rib auto saw (rib saw) that provides a consistent rectangular shaped rack of ribs with relatively high yield. In embodiments, first and second rails that are in contact with shell bones, as the shell bones pass through the rib saw, are adjusted to dynamically position each shell bone in relation to a saw blade to achieve the consistent rack of ribs with relatively high yield.

Figure 1:
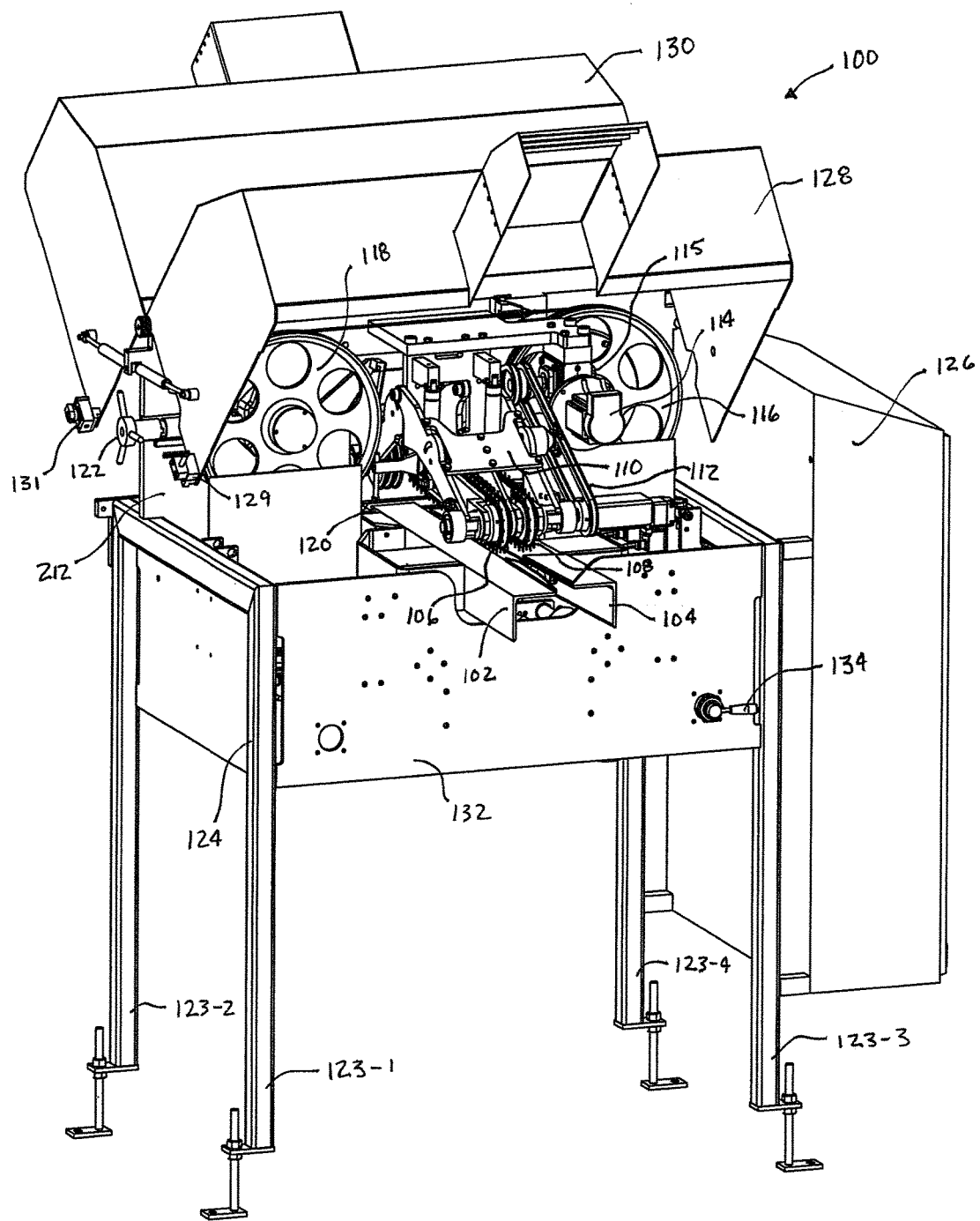
FIG. 1 is a front perspective view of a loin back-rib auto saw (rib saw) of one embodiment of the present invention.

In FIG. 1 a front perspective view of an automatic rib saw 100 of one embodiment is illustrated. As illustrated in FIG. 1, rib saw 100 includes a base 124, a control housing 126 and a first and second cover 128 and 130. The base 124 in this embodiment includes four legs 123-1 through 123-4 that are adjustable in height to allow for the leveling of the rib saw 100. The base 124 further includes a front panel 132 that provides a support where components of the rib saw 100 are mounted. An air valve 134 that is used to lift a sticker chain assembly 110 is mounted on the front panel 132. The control housing 126 contains portions of a control system 700 used to operate the saw 100. The control system 700 is further described below in regards to FIG. 7. The first and second covers 128 and 130 are pivotally coupled to main saw blade plate 212. During operation of the saw 100, the first and second covers 128 and 130 are rotated to a closed position to cover most of the moving parts of the saw 100 to prevent injuries. In one embodiment, a latch system including a first portion 129 on the first cover 128 and a second portion 131 on the second portion 130 is used to retain the covers 128 and 130 in the closed position during operation of the saw 100.

The saw of FIG. 1, further includes a first and second blade wheel 116 and 118 upon which a band blade 120 is mounted. The blade 120 is tightened on the wheels 116 and 118 with the use of a blade tensioning mechanism 122. The saw 100 further includes a sticker chain assembly 110 that includes a first and a second sticker chain 106 and 108. The first and second sticker chains 106 and 108 are designed to engage and move shell bones 302 through the saw 100. The sticker chains 106 and 108 move via sprockets that are rotated via roller chain 112. The roller chain 112 is rotated via a 90 degree gearbox 115. The gearbox 115 is controlled by a servo drive motor 114 that is in communication with controller 702. The sticker chain assembly 110 is further described below. FIG. 1 also illustrates first and second rails 102 and 104. In embodiments, the first and second rails 102 and 104 move to dynamically position shell bones in relation to the saw blade 120. The sticker chains 106 and 108 move the shell bones along the first and second rails 102 and 104 to the blade 120.

Figure 2:
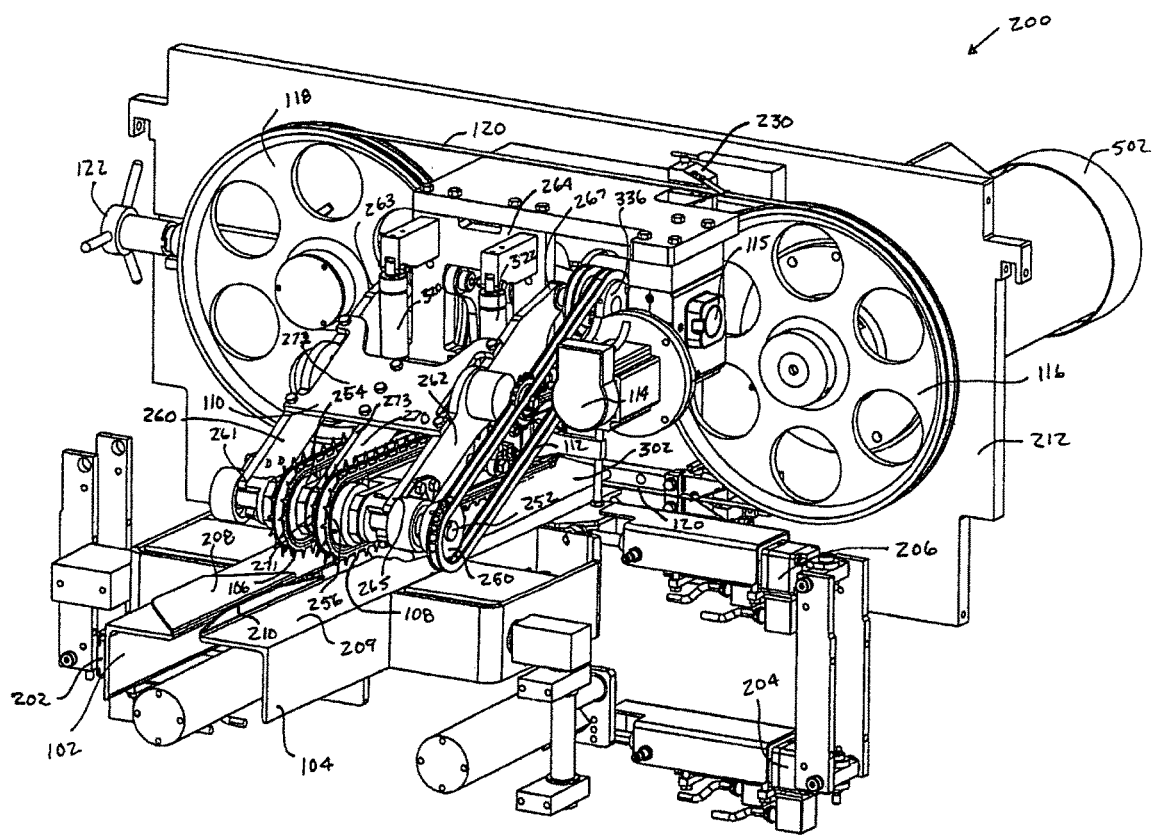
FIG. 2, is a front perspective view a portion of a rib saw of one embodiment of the present invention.

In FIG. 2, a front perspective view of a portion 200 of rib saw 100 of one embodiment is illustrated. FIG. 2 further illustrates features of the rib saw 100. In particular, FIG. 2 illustrates that the first rail 102 includes a tapered guide 208 that extends from a top surface 207 and that the second rail 104 also includes a tapered guide 210 that extends from its top surface 209. The tapered guides 208 and 210 help guide shell bones 302 into a proper position in relation to the first and second rails 102 and 104. Also illustrated in FIG. 2 is a blade guide 230 that is used to help retain the blade 120 on the blade wheels 116 and 118. Blade wheel 116 is rotated by blade motor 502 which is better illustrated in FIG. 5.

Referring back to FIG. 2, the sticker chain assembly 110, as discussed above, includes sticker chains 106 and 108 and roller chain 112. In particular, in this embodiment, the roller chain 112 engages a sprocket 250 coupled to a sticker drive shaft 252. When the sticker drive shaft 252 rotates, sticker sprockets 254 and 256 that are in contact with respective sticker chains 106 and 108 rotate, thereby moving the sticker chains 106 and 108. The sticker assembly 110 also includes a first arm 260 and a second arm 262. A first end 261 of the first arm 260 is rotationally coupled to the sticker drive shaft 252 and a second end 263 of the first arm 260 is pivotally coupled to a support 264. Moreover, a first end 265 of the second arm 262 is rotationally coupled to the sticker drive shaft 252 and a second end 267 of the second arm 262 is also pivotally coupled to the support 264. This arrangement allows a height between sticker chains 106 and 108 and the rails 102 and 104 to vary to ensure the sticker chains properly engage the shell bones 302 to draw the shell bones 302 into the saw 100 even if the shell bones 302 vary in shape. Also illustrated in FIG. 2 is a mid arm 270 of the sticker chain assembly 110 that has a first end 271 rotationally coupled to the sticker drive shaft 252 and a second end 273 coupled to a connecting plate 272 of the sticker drive assembly 110. As illustrated, mid portions of the first and second arms 260 and 262 are also coupled to the connecting plate 272. In embodiments air cylinders 320 and 322 coupled to air valve 134 are used to lift the sticker chain assembly 110.

Figure 3:
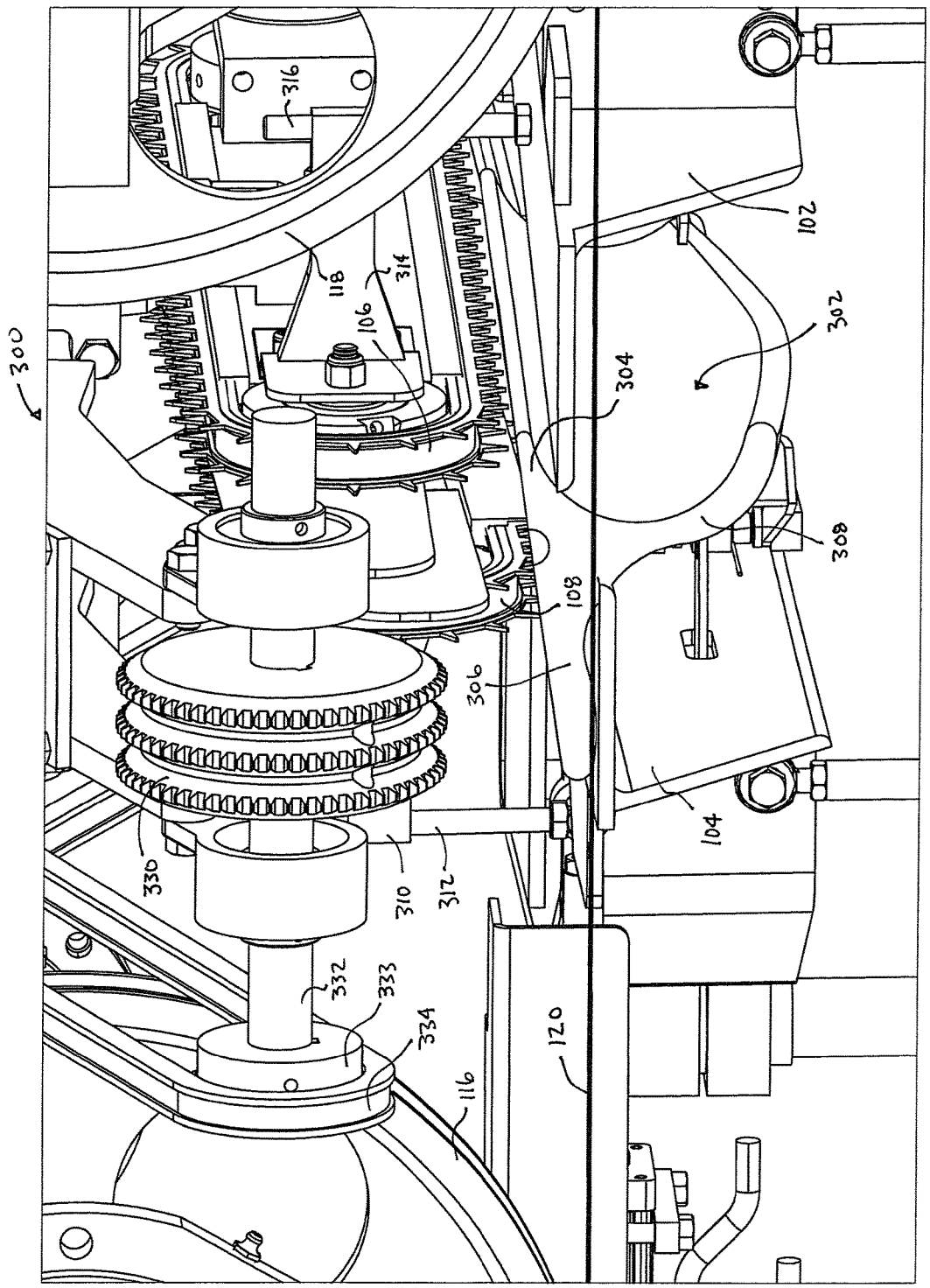
FIG. 3, is a back perspective close up view of a portion of a rib saw illustrating movement of rails of one embodiment of the present invention.

As discussed above, embodiments of the present invention move the first and second rails 102 and 104 to position shell bones 302 in relation to the saw blade 120. In embodiments, actuators 202, and 204 are used to move the rails 102 and 104. In the embodiment of FIG. 2, actuator 202 is used to move the first rail 102 up or down (vertical movement), actuator 204 is used to move the second rail 104 up or down (vertical movement) and actuator 206 is used to move the second rail 104 closer to or farther away from the first rail 102 to adjust a gap 240 between the first and second rails 102 and 104 (horizontal movement). The actuators 202, 204 and 206 and their movements are further discussed in regards to FIG. 4 below. An example of a movement between rails 102 and 104 is further illustrated in FIG. 3. FIG. 3 illustrates a back view of a portion 300 of the rib saw 100. FIG. 3 illustrates a shell bone 302 held between the first rail 102 and the second rail 104. As this Figure illustrates, the operational height of the first and second rails 102 and 104 are dynamically adjusted in relation to each other to position the shell bone 302 in relation to the saw blade 120.

In particular, in the illustration of FIG. 3, the first rail 102 is positioned higher than the second rail 104. Moreover, the height position of the sticker chains 106 and 108 in the back of the saw 100 can vary in relation to each other as illustrated. This allows for the respective sticker chains 106 and 108 to maintain in contact with the shell bone 302 to move the shell bone 302 across the rails 102 and 104 to the blade 120. In particular, in FIG. 3, sticker chain 106 is in contact with the back bones 304 of the shell bone 302 and sticker chain 108 is in contact with the feather bones 306 of the shell bone 302. The ribs 308 of the shell bone 302 are moved under the first and second rails 102 and 104 as illustrated. In the embodiment, of FIG. 3, braces 314 and 310 support threaded bolts 312 and 316 respectively. The braces 310 and 314 prevent the sticker chains 106 and 108 from striking the guide rails 102 and 104 when no shell bone is present 302. Moreover, the threaded bolt 312 allows the gap between sticker chain 106 and rail 102 to be adjustable, and threaded bolt 316 allow the gap between sticker chain 108 and rail 104 to be adjustable. FIG. 3, also illustrates a grabbing wheel 330 that is used to grab the vertebra (separated back bones 304 and feather bones 306) to separate them from the ribs 308 after the cut. This helps to collect the vertebra separately from the ribs 308. In this embodiment, the grabbing wheel 330 is rotated by grabbing wheel shaft 332 that is coupled to sprocket 333. Sprocket 333 is rotated via roller chain 334, which in one embodiment is connected to sprocket 336 of the gearbox 115.

Figure 4:
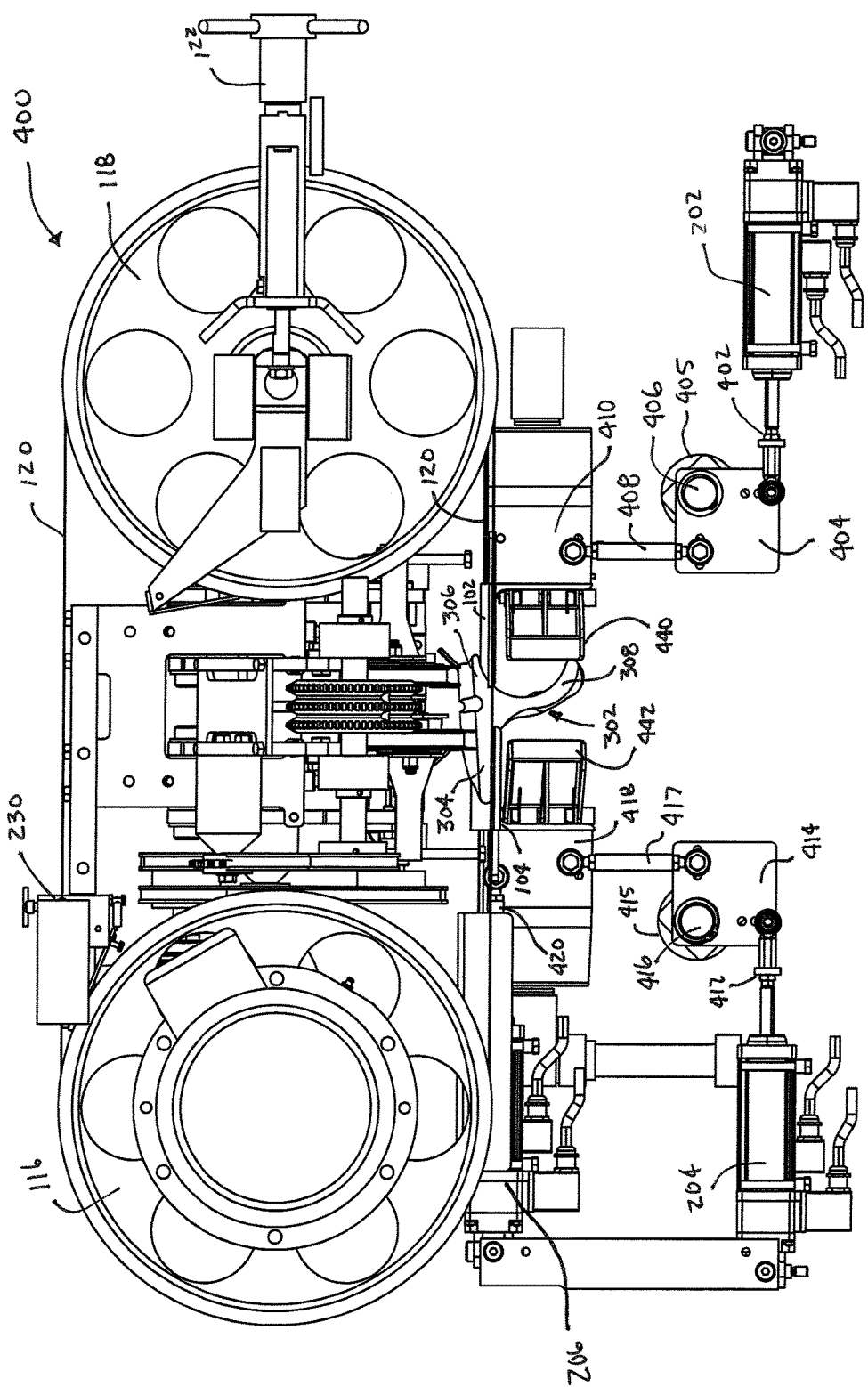
FIG. 4, is back view of a portion of the rib saw of one embodiment of the present invention.

FIG. 4, illustrates a back view of a portion 400 of rib saw 100. In particular, FIG. 4 is used to illustrate the mechanisms that move the first and second rails 102 and 104. A first linear actuator 202 is connected to move the first rail 102 up or down (in a vertical direction). In particular, the first linear actuator 202 is coupled to a first connector member 402. First connector member 402 is pivotally coupled to pivot plate 404. Pivot plate 404 has a pivot connection 406 to a support 405. When linear actuator 202 moves, pivot plate 404 rotates about pivot connection 406. A second connection member 408 is also pivotally coupled to pivot plate 404 to provided vertical movement. As illustrated, second connection member 408 is pivotally coupled to third connection member 410 which in turn is coupled to the first rail 102.

A second linear actuator 204 is connected to move the second rail 104 up or down (in a vertical direction). In particular, the second linear actuator 204 is coupled to a first connector member 412. First connector member 412 is pivotally coupled to pivot plate 414. Pivot plate 414 has a pivot connection 416 to a support 415. When linear actuator 204 moves, pivot plate 414 rotates about pivot connection 416. A second connection member 417 is also pivotally coupled to pivot plate 414 to provided vertical movement. As illustrated, second connection member 417 is pivotally coupled to third connection member 418 which in turn is coupled to the second rail 104.

A third linear actuator 206 is connected to the second rail 104, in this embodiment, to provide horizontal movement to adjust the gap 240 between the first rail and second rail 102 and 104. A first connection member 420 is coupled between the third actuator 206 and the second rail 104. Each of the first, second and third actuators 202, 204 and 206 are dynamically controlled by a controller 702. That is, while a shell bone 302 is passing along the rails 102 and 104, the rails are being adjusted so that the blade 120 makes a desired cut in the shell bone 302. The controller 702 is further described below in regards to FIG. 7.

Figure 5:
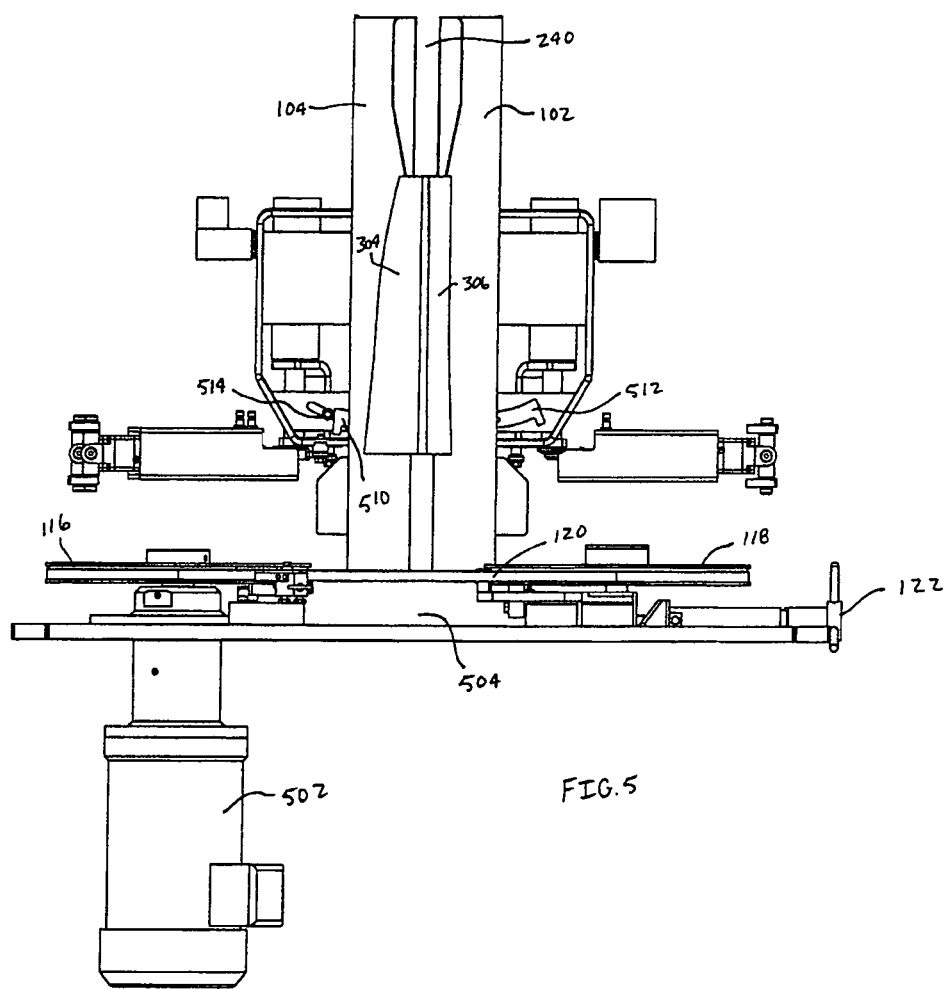
FIG. 5, is a top view of a portion of the rib saw of an embodiment of the present invention.

In embodiments, sensors, such as sensors 602 and 604 of FIG. 6 and sensor 514 of FIG. 5 are used by the controller, at least in part, to determine the then current position of the shell bone 302 so that the first and second rails 102 and 104 can be adjusted to achieve the desired cut. Sensor 602 senses the location and sensors 604 and 514 sense the orientation of the shell bone 302 as the shell bone 302 passes across and between the first and second rails 102 and 104. Portions of orientation sensors 604 and 514 are illustrated in FIG. 4. In particular, the orientation sensors 604 and 514 (which are further described in regard to FIG. 7), include deflection portions 440 and 442. Deflection portion 440 is coupled under rail 102 and deflection portion 442 is coupled under rail 104. The deflection portions 440 and 442 are each rotatably coupled under the respective rail 102 and 104. As FIG. 4 illustrates, the rib section (or ribs) 308 of the shell bone 302 curls under the back bone 306 of the shell bone 302. Determining the whether the ribs curl under the first rail 102 (first orientation) or the second rail 104 (second orientation) is needed to determine the correct position of the first and second rails 102 and 104 to achieve the desired cut. In use, a shoulder end of the shell bone 302 is inserted first into the saw 100 since this is the area where an angled cut is to be preformed to obtain a desired rectangular shape of a rack of ribs. Deflection portions 440 and 442 determine whether the shell bone 302 is from the left side or the right side of the animal. In the example of FIG. 4, ribs 308 contact deflection portion 440. In response to the contact, the contact deflection portion 440 deflects indicating the ribs curl under the first rail 102 (a first orientation).

Figure 6A:
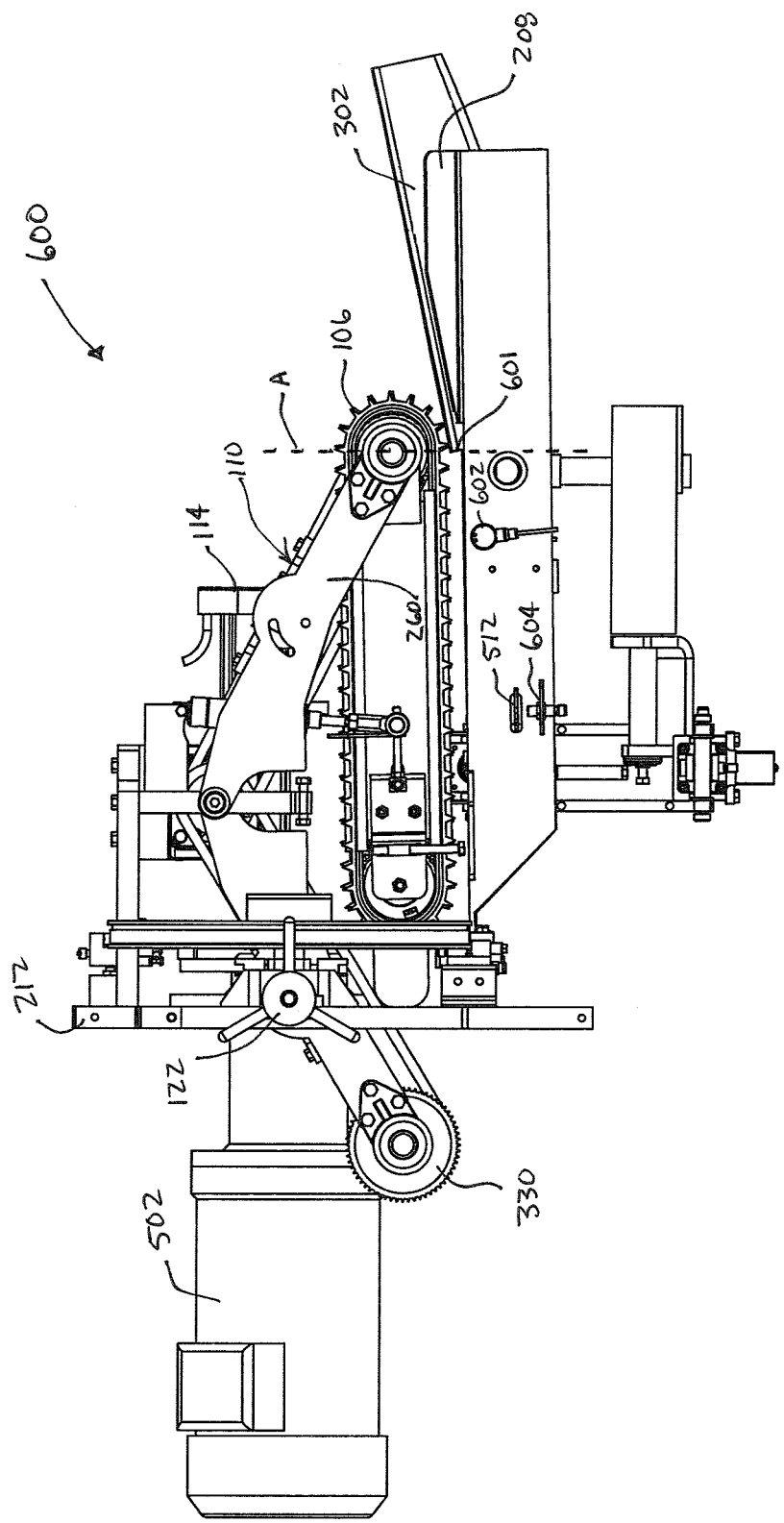
FIG. 6A through 6D are side views of a portion of the rib saw illustrating positions of a shell bone as it passes through a rib saw of one embodiment of the present invention.

Referring to FIG. 5, a partial 500 top view of the rib saw 100 of one embodiment is illustrated. FIG. 5, further illustrates other portions of the orientation sensors 604 and 514. As a result of the ribs deflecting deflection portion 440 as illustrated in FIG. 4, an associated coupled flag 512 is moved to cover a sensor 604 (not shown in FIG. 5 since flag 512 is covering it). Sensor 604 is illustrated in FIG. 6A. Sensor 604 (a proximity sensor in one embodiment) provides a signal to the controller 702 to indicate the detected orientation. Sensor 514 is illustrated in FIG. 5. As associated flag 510 is in a retracted position since the shell bone 392 is not orientated to deflect its associated deflection portion 442. FIG. 5, also illustrates a plow 504 which helps separate the feather bone 304 and back bone 306 from the ribs 308 after the cut. Also illustrated is the saw motor 502 that rotates saw wheel 116.

Figure 6B:
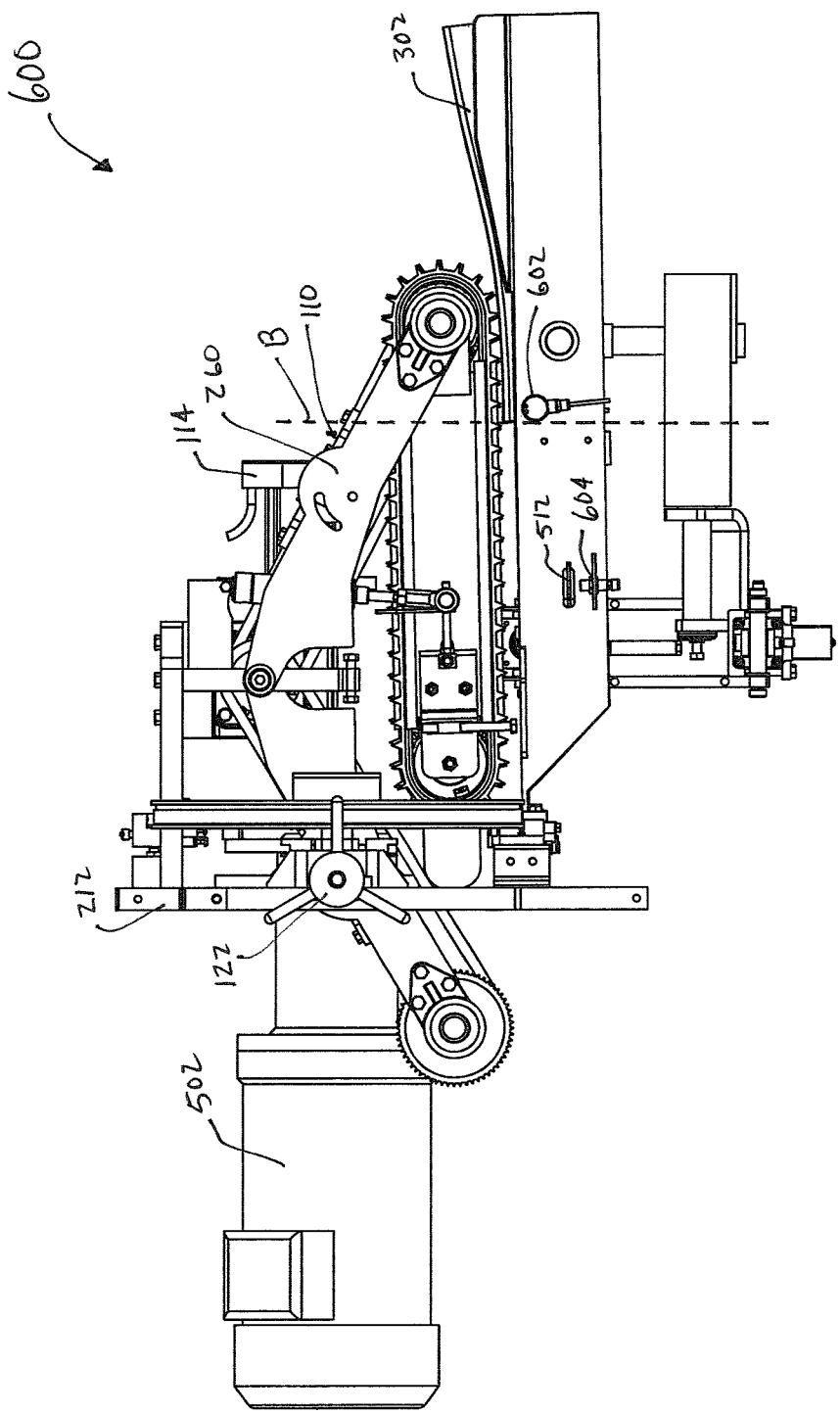

As discussed above, in embodiments the first and second rails 102 and 104 are dynamically moved to achieve a desired cut as the shell bones 302 pass across and through the first and second rails 102 and 104. FIGS. 6A through 6D illustrates a partial side view 600 of the rib saw 100 as a shell bone passes across and through the first and second rails 102 and 104. In particular, in FIG. 6A a leading edge 601 of shell bone 302 is positioned at A. At position A the sticker chains 106 and 108 engage the leading edge of the shell bone 302. In FIG. 6B the leading edge 601 of the shell bone 302 has moved to position B where a photo eye 602 senses its location. In one embodiment, a signal from the photo eye 602 of the detection of the leading edge 601 is used to set a counter 720 associated with the servo motor controller 712 to zero. The counter 720 is used to determine the location of the shell bone 302 by tracking the movement of the sticker chains 106 and 108. This is further discussed below in regards to FIG. 8.

Figure 6C:
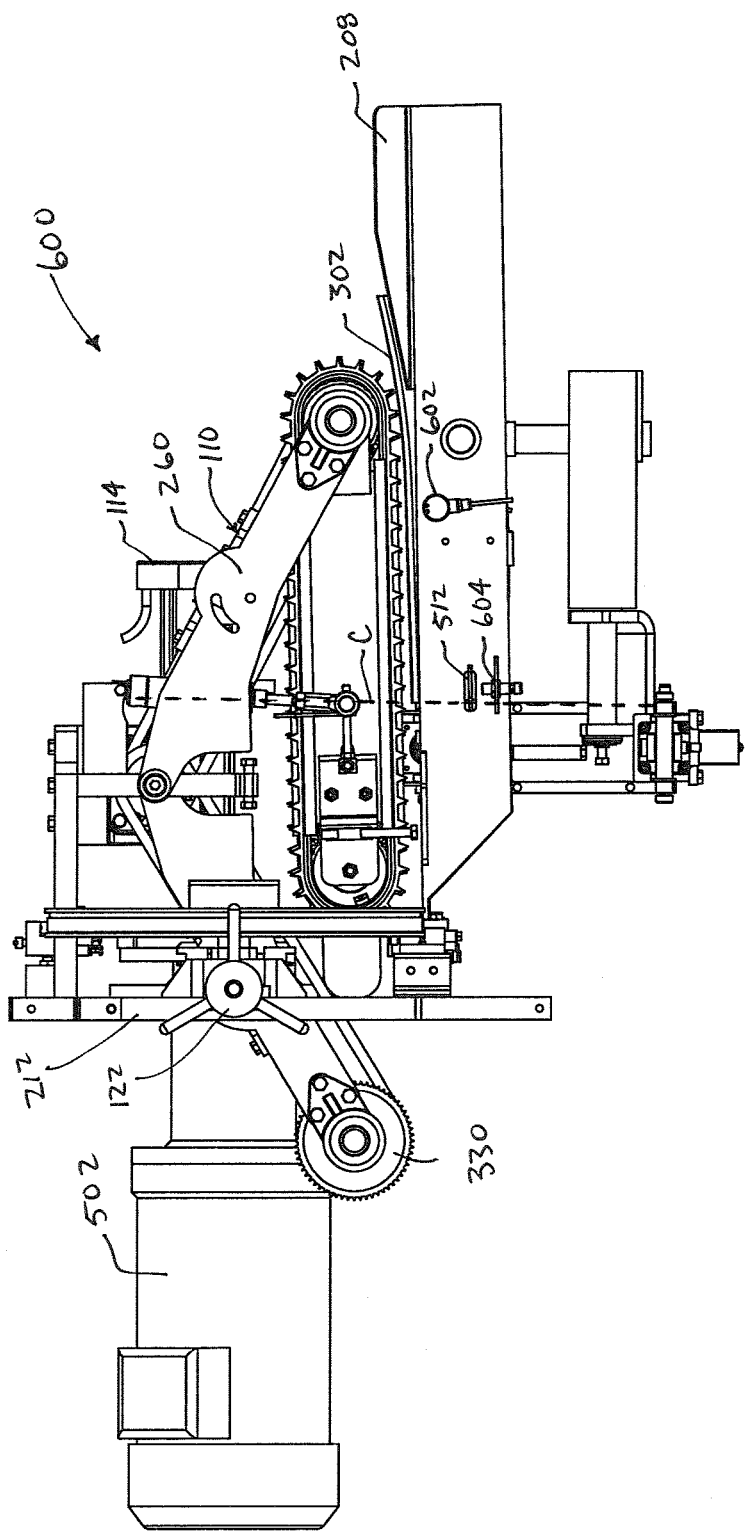
Figure 6D:
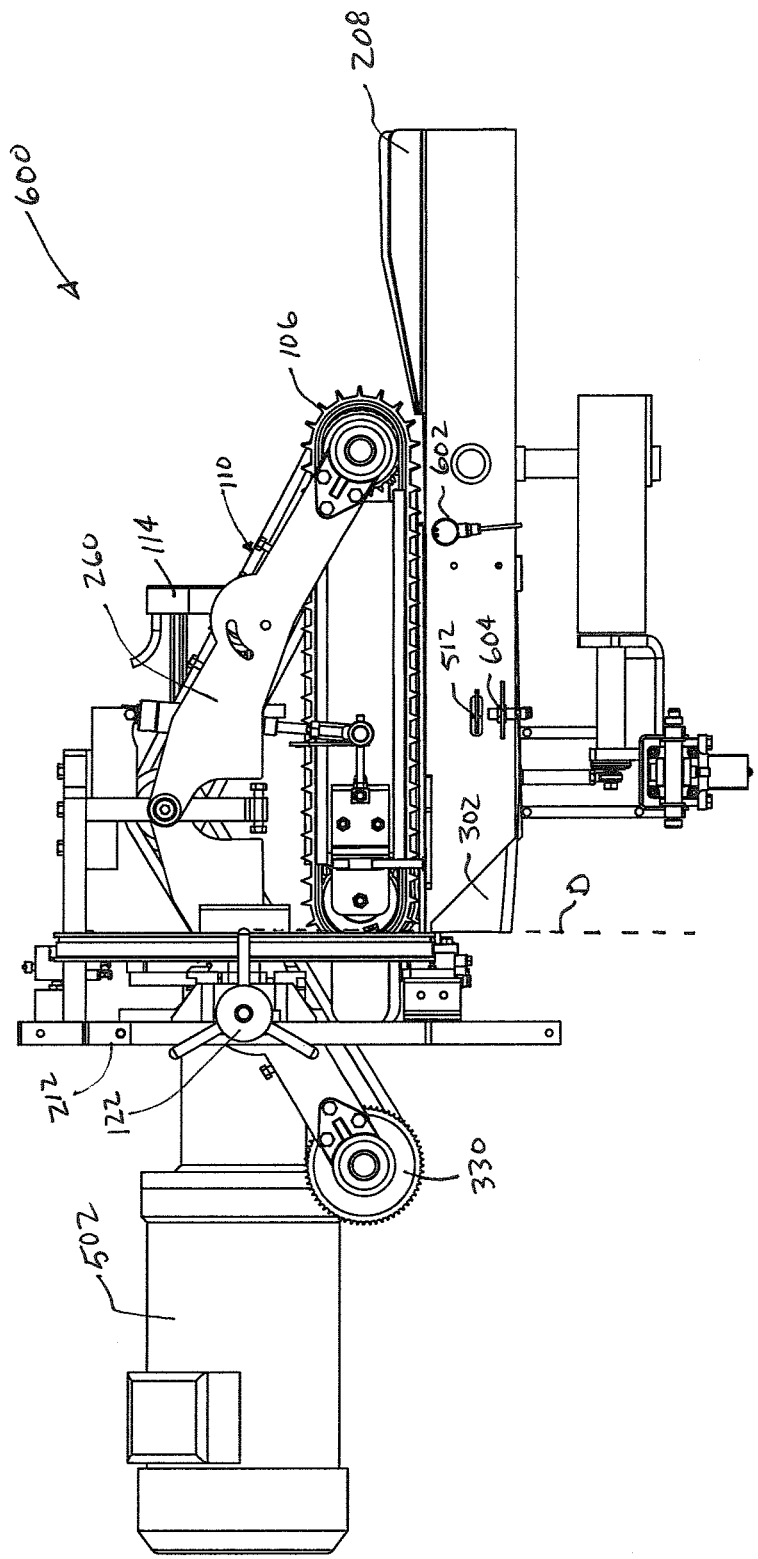

In FIG. 6C the leading edge 601 of the shell bone 302 has moved to position C. At position C, in one embodiment the orientation sensor 604 and 514 are used. In particular, in FIG. 6C, a flag portion 512 is moved to be detected by proximity sensor 604 of a respective orientation sensor 604 or 514 to determine the orientation of the shell bone 302. In FIG. 6D, the leading edge of the shell bone has reached the blade at position D. In embodiments, the first and second rails 102 and 104 are dynamically positioned to achieve a desired cut based on the then location of the shell bone 302 and the orientation of the shell bone 302 as determined by the respective sensors (photo eye sensor 602 and the proximity sensor 604).

Figure 7:
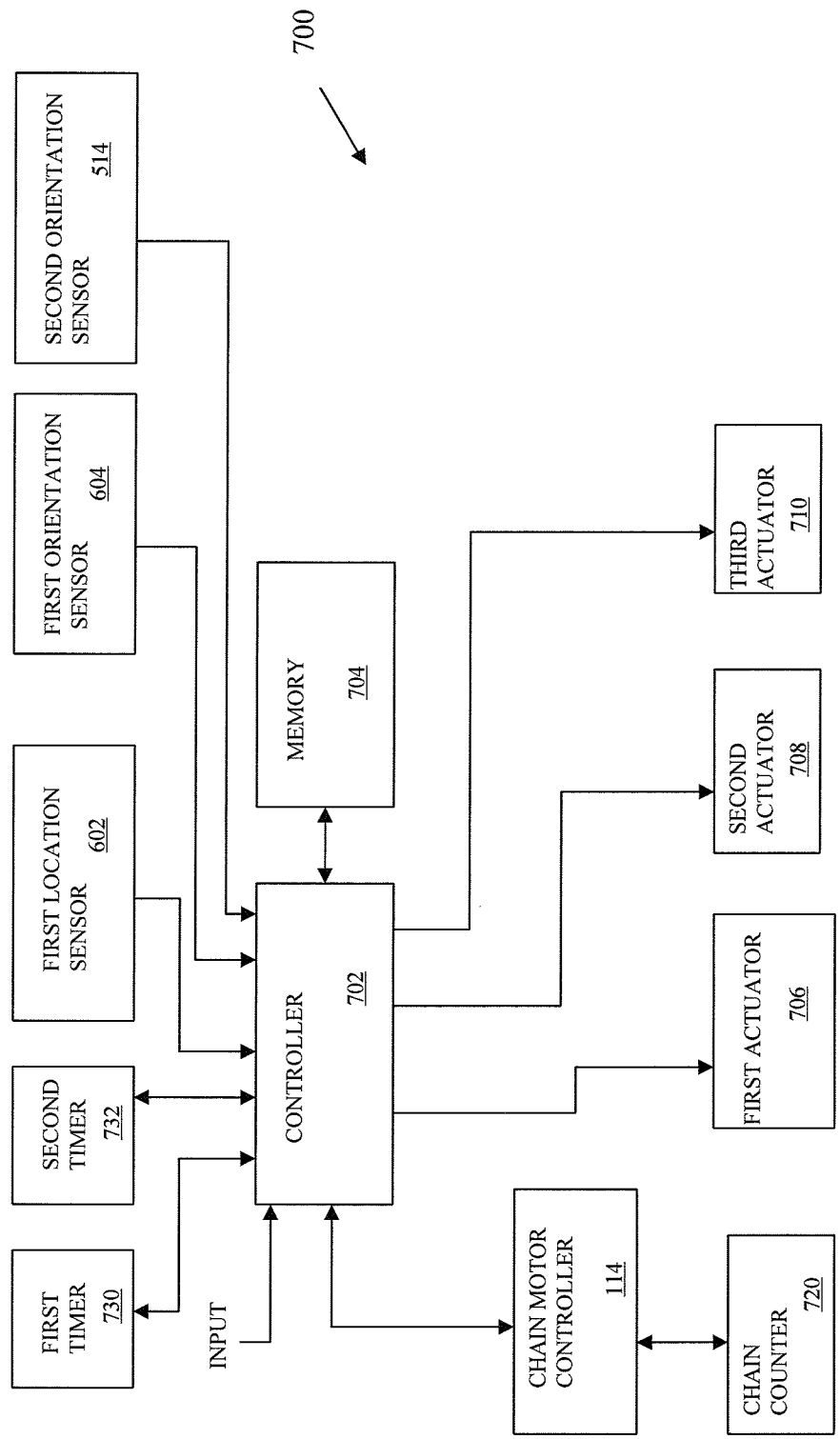
FIG. 7, is a block diagram of a saw control system of one embodiment of the present invention.

FIG. 7 set out a block diagram of a control system 700 of one embodiment of a rib saw 100. The control system 700 includes a controller 702 that controls the first actuator 202, the second actuator 204 and the third actuator 206. The controller 702 can be referred to as the main controller 702. As discussed above, in one embodiment, the first actuator 202 moves the first rail 102 up or down, the second actuator 204 moves the second rail 104 up or down and the third actuator moves the second rail 104 closer to or farther away from the first rail 102 to adjust the gap between the first and second rails 102 and 104. The controller 702 has an input to receive instructions on how to control the actuators 202, 204 and 206. The instructions are stored in memory 704. The controller 702 is coupled to receive a location signal from location sensor 602 which in one embodiment is a photo eye. The location signal indicates that a leading edge of a shell bone 302 has been detected. In response to location signal, the controller 702 directs the chain motor controller 712 of the sticker chains 106 and 108 to reset chain counter 720. This is used to track the position of the sticker chains 106 and 108. The controller 702 then uses the information of the position of the sticker chains (generally referred to as the feed chain position) from the counter to track the then current position of the shell bone 302. As further illustrated, the controller is coupled to the first orientation sensor 604 and the second orientation sensor 514. Based on signals from the location sensor 602, the orientation sensors 604 and 514 and the chain counter 720, the controller 702 applies instructions from the memory 704 to position the first and second rails 102 and 104 via the first, second and third actuators 202, 204 and 206. In one embodiment, a first and second timer 730 and 732 is used to time the length of time the first and second orientation sensors 604 and 514 are activated. A short length of time may indicate the detection of debris and not the orientation. Hence, in this embodiment, the controller 702 ignores signals from the first and second orientation sensors 604 and 514 that do not occur for a period longer than a predetermined amount of time that indicates a valid reading.

Figure 8:
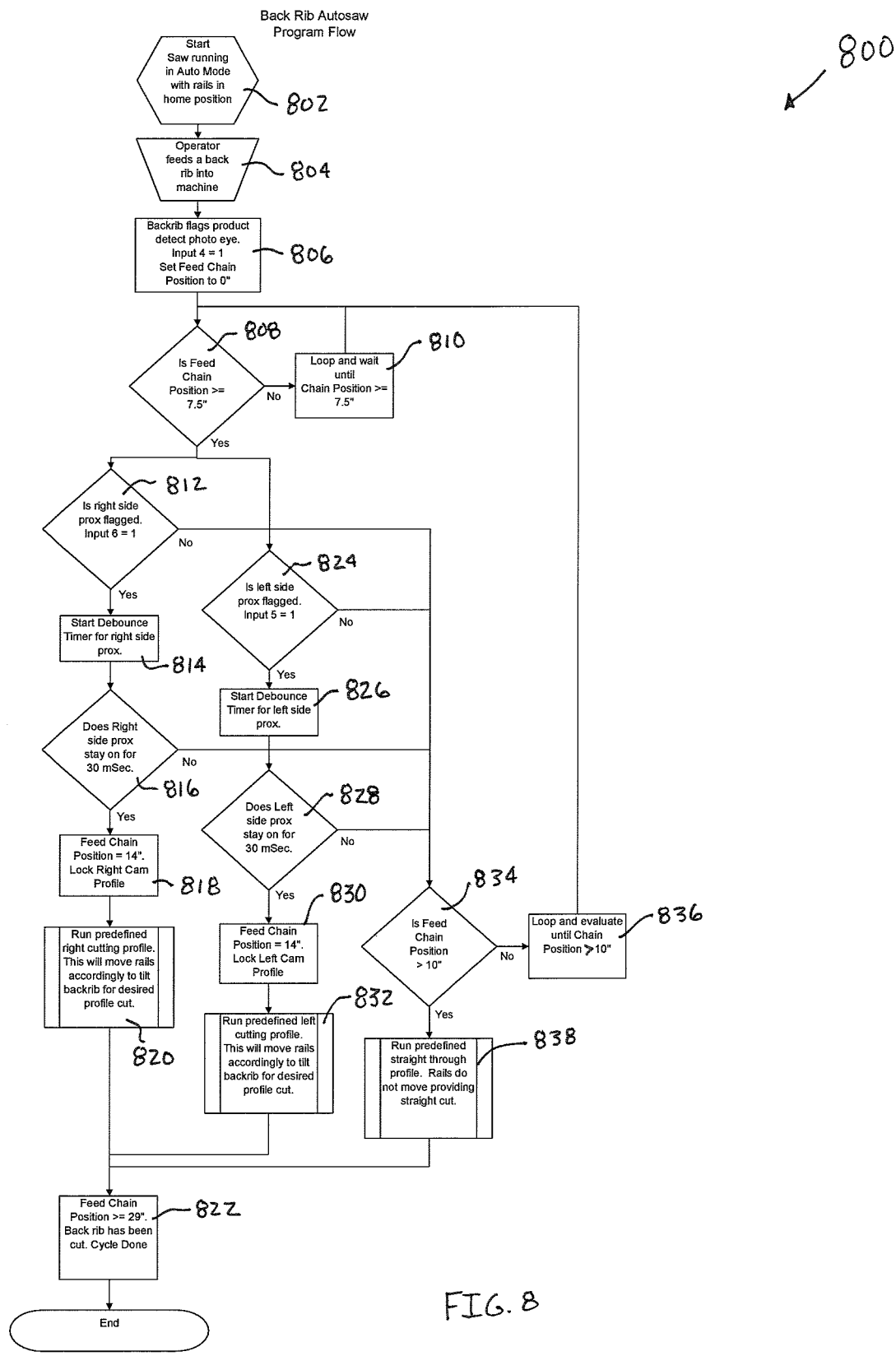
FIG. 8, is a process flow diagram of one embodiment of the present invention.

Referring to FIG. 8 a process flow diagram 800 of one embodiment is illustrated. As illustrated, the process starts by starting the saw 100 and positioning the rails 102 and 104 in a home position (802). A back rib or shell bone 302 is fed into the saw 100 (804). As FIG. 4 illustrates, the shell bone 302 is fed into the saw 100 by placing the feather bones 304 and back bones 306 on top of the respective rails 102 and 104 (depending on the shell bone 302 orientation) while the rib portion 308 extends between gaps 240 to below top surfaces 207 and 209 of the respective rails 102 and 104. After the shell bone 302 is feed into the saw 100, a signal is sent when a leading edge 601 of the shell bone 302 is detected by photo eye 602 (806). Also at (806), the sticker chain (feed chain) 106 and 108 position is set to zero (i.e. the chain counter is reset to zero). The movement of the feed chain 106 and 108 is then monitored to determine the distance the shell bone 302 has moved.

It is then determined if the feed chain 106 and 108 position is equal to or greater than 7.5 inches (808). If the feed chain position is not equal to or greater than 7.5 inches (808), the process continues to loop and wait at (810). Once the feed chain 106 and 108 position is equal to or greater than 7.5 inches (808), the process continues by determining the orientation of the shell bone 302. In particular, if a first orientation sensor 604 (left side sensor) is flagged at (824), first timer 730 is started (826). The first timer 730 remains on while the first orientation sensor 604 is sensing a detection of the rib portion 308. First timer 730 is used by the controller 702 to verify the detection by the first orientation sensor 604. The controller 702 at (828) determines if the first timer stayed on for 30 mSec. If the first timer 730 is on less than 30 mSec it is determined that debris likely set off the proximity switch 604 of the first orientation sensor 604. If the first timer 130 remains on for 30 mSec (830), a first orientation (left profile) is selected (830). The controller 702 then runs a selected profile moving the rails 102 and 104 thereby dynamically positioning the shell bone 302 to achieve a desired cut for the ribs 308 (832). When the feed chain position is greater then or equal to 29 inches the cut has been completed and the cycle is done (822).

If the orientation is indicated by the second orientation sensor 514 (right side orientation) (812), a second timer 732 is started at (814). The second timer 732 remains on while the second orientation sensor 514 is sensing a detection of the rib portion 308. Second timer 732 is used by the controller 702 to verify the detection by the second orientation sensor 514. The controller 702 at (816) determines if the second timer 732 stayed on for 30 mSec. If the second timer 732 is on less than 30 mSec it is determined that debris likely set off the proximity switch 514 of the second orientation sensor 514. If the second timer 732 remains on for 30 mSec (830), a second orientation (right profile) is selected (818). The controller 702 then runs a selected profile moving the rails 102 and 104 thereby positioning the shell bone 302 to achieve a desired cut for the ribs 308 (820). When the feed chain position is greater then or equal to 29 inches the cut has been completed and the cycle is done (822).

If the respective first or second timer 730 or 732 does not remain on for 30 mSec at (816) or at (828) to verify a detected respective orientation, it is determined if the feed chain position is greater than 10 inches (834). If it is not, the process is evaluated at (836) and loop back at step (808) when the feed chain position is less than 10 inches. If the feed chain position is greater than 10 inches at (834), a predefined straight profile is run (838). During the predefined straight profile, the rails 102 and 104 do not move and a straight cut of the shell bone 302 is achieved. Once the feed chain 106 and 108 hits a position that is equal to or greater than 29 inches the shell bone 302 has been cut and the cycle is done at (822). The cycle will start over when the operator feeds another shell bone 320 into the rib saw 100 at step (804).

Figure 10:
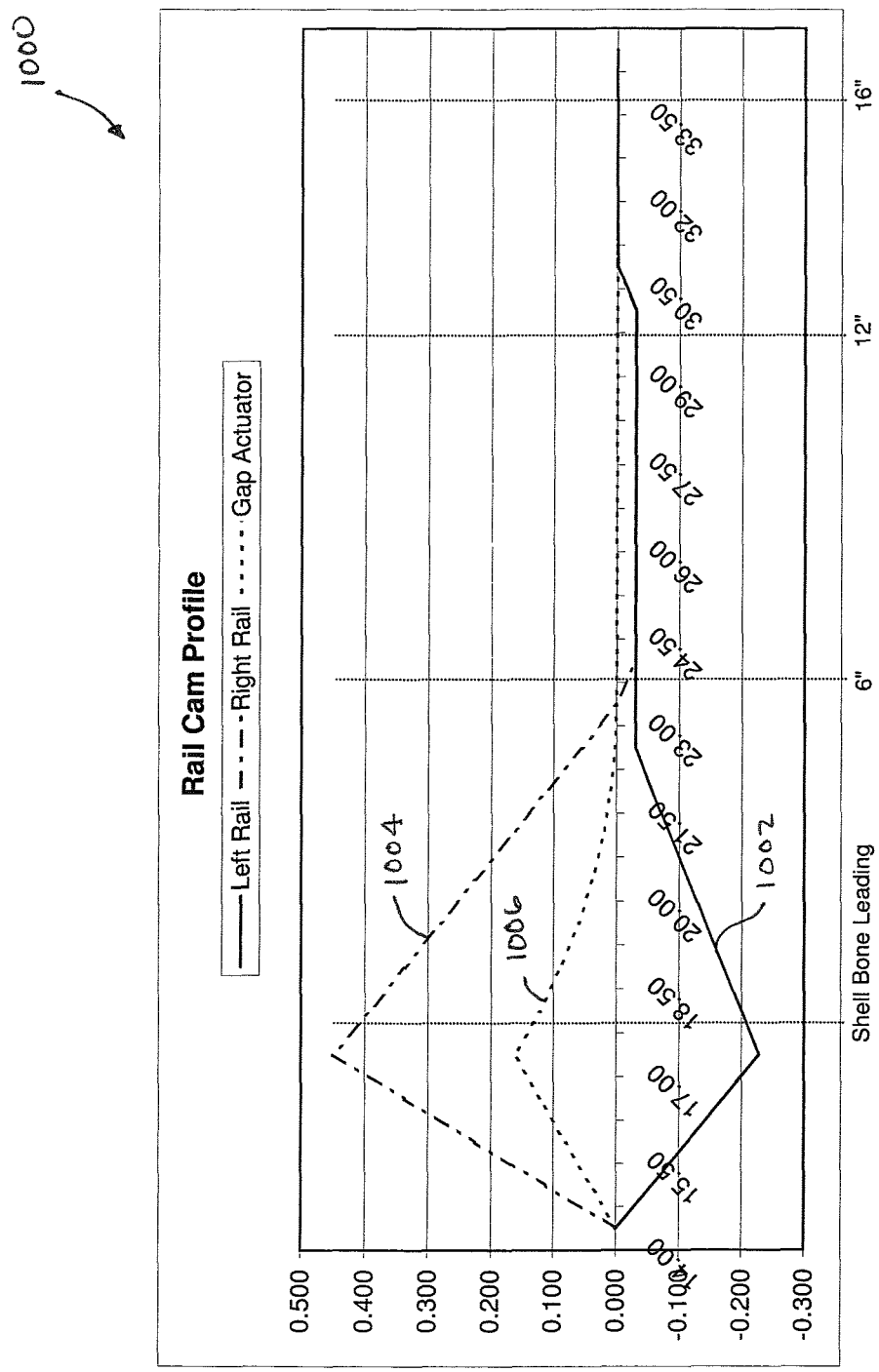
FIG. 10, is a rail cam profile graph of one embodiment of the present invention.

FIG. 9 illustrates a profile table 900 providing an example of rail positions as a shell bone 302 is being processed through a rib saw 100 of one embodiment. As illustrated, the table includes a first column 902 for the first rail 102, a second column for the second rail 104 and a third column 906 for the gap between the rails 102 and 104. The first column 902 and the second column 904 include rail height positions at select feed chain positions and the third column 906 includes gaps at select feed chain positions. For example, referring to highlighted row 908, regarding the first rail 102, the feed chain position is 17.00 inches and the position of the first rail is at −1.228 inches. Regarding the second rail 104, the position of the second rail is 0.449 inches at feed chain position 17.00 inches. The gap between the first and second rails 102 and 104 at the feed chain position of 17.00 inches is at 0.161 inches. As the profile table illustrates, as the shell bone 302 passes through the rib saw 100 the first and second rails 102 and 104 are dynamically adjusted to achieve a desired cut. The numbers outside the table on the left represent the distance of the leading edge of the shell bone to the saw blade 120. A corresponding rail cam profile graph 1000 of FIG. 10, further illustrates the dynamic movement of the first and second rail 102 and 104 during the cut of the shell bone 302. Graph 1000 sets out a vertical measure along the left vertical column and the feeder chain distance along the 0.0 vertical measurement point. In FIG. 10, 1002 represents the first rail profile, 1004 represents the second rail profile and 1006 represents the gap profile.

Figure 11:
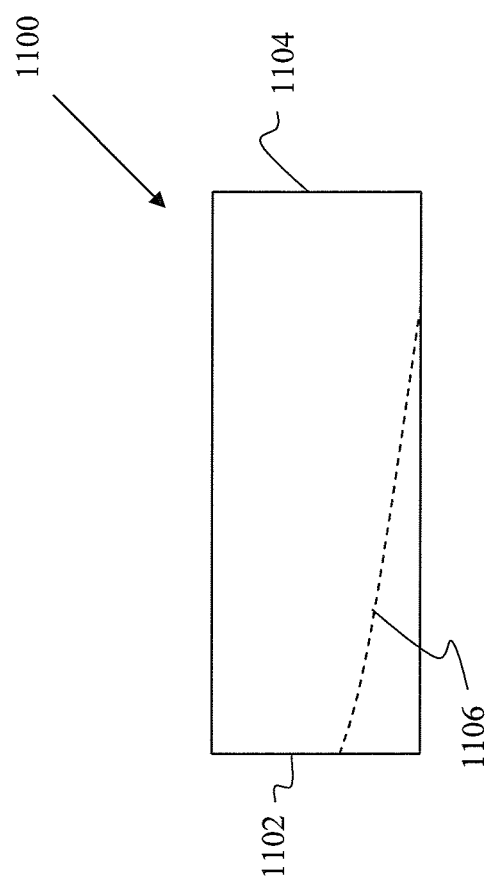
FIG. 11, an illustration of a shape of a rack of ribs formed with an embodiment of the present invention.

As discussed briefly above, embodiments of the present invention provide a controlled cut to separate the rib portion 308 from the shell bone 302. It is desired to achieve a consistent rectangular rack of ribs from the shell bone 302. As discussed above, this is done by moving the first and second rails 102 and 104 to guide the shell bone 302 into the blade 120. FIG. 11 illustrates an example of a desired rectangular cut of a rack of ribs 1100. As illustrated, a length of a first end 1102 of the rack of ribs 1100 is approximately the same length as the second end 1104 of the rack of ribs 1100. Further illustrated in FIG. 11 by dashed line 1106 is an indication of the shape of the rack of ribs 1100 with a straight cut. Hence, the dashed line 1106 represents the shape of the rack of ribs if cut without the use of moveable first and second rails 102 and 104 of the embodiments discussed above.

Embodiments of the control system 700 of FIG. 7 incorporate processors and memory (such as memory 704) to store instructions in implementing steps set out in the flow diagram of FIG. 8. A processor includes or functions with software programs, firmware or computer readable instructions for carrying out various methods, process tasks, calculations, and control functions. These instructions are typically tangibly embodied on any appropriate medium used for storage of computer readable instructions or data structures. Such computer readable media can be any available media that can be accessed by a general purpose or special purpose computer or processor, or any programmable logic device. Suitable computer readable media may include storage or memory media such as magnetic or optical media, e.g., disk or CD-ROM, volatile or non-volatile media such as RAM (e.g. SDRAM, DDR SDRAM, RDRAM, SRAM, etc.), ROM, EEPROM, flash memory, etc.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. For example, embodiments can be used with any type of item that has a shape that requires dynamic positioning in relation to a saw blade as the item is being cut to achieve a desired cut. Therefore, it is manifestly intended that this invention be limited only by the claims and the equivalents thereof.

The invention claimed is:
1. A saw system comprising:
   a saw blade;
   a first rail;
   a second rail, the first rail and the second rail positioned proximate the saw blade to provide a guide path for an item to be cut to the saw blade;
   at least one actuator connected to move at least one of the first and second rails to adjust a position of the first and second rails in relation to each other to orientate the item relative to the saw blade;
an item moving assembly configured to move the item to be cut along the first and second rails to the saw blade; and
a controller to control the at least one actuator to dynamically position the item as the item moves along the first and second rails to achieve a desired cut with the saw blade.

2. The saw system of claim 1, wherein the at least one actuator further comprises:
a first actuator coupled to provide a vertical movement of the first rail; and
a second actuator coupled to provide a vertical movement of the second rail.

3. The saw system of claim 2, further comprising:
a third actuator coupled to provide a horizontal movement of at least one of the first and second rails to dynamically adjust a gap between the first and second rails as the item moves along the first and second rails.

4. The saw system of claim 1, wherein the item is shell bone.

5. The saw system of claim 1, further including:
at least one sensor in communication with the controller to determine at least one location of the item along the first and second rails.

6. The saw system of claim 1, wherein the item moving assembly further comprises:
a sticker chain assembly configured to grab the item and slide it along the first and second rails to the saw blade.

7. The saw system of claim 6, wherein the sticker chain assembly further comprises:
a first sticker chain to move the item along the first rail; and
a second sticker chain to move the item along the second rail.

8. The saw system of claim 7, wherein at least a portion of the first sticker chain is configured to adjust to the then current dynamic position of the first rail to maintain contact with the item and at least a portion of the second sticker chain is configured to adjust to the then current dynamic position of the second rail to maintain contact with the item.

9. The saw system of claim 1, further comprising:
a memory to store instructions regarding the sawing of the item, the controller in communication with the memory.

10. The saw system of claim 1, further comprising:
at least one orientation sensor configured to detect the orientation of the item.

11. A rib saw, the saw comprising:
a saw blade;
a first rail;
a second rail, the saw blade positioned proximate the first and second rails, the first and second rails configured to orientate a shell bone in relation to the saw blade;
a sticker chain assembly configured to move the shell bone along the first and second rails;
a plurality of actuators coupled to move the first and second rails in relation to each other to orientate the shell bone in relation to the saw blade; and
a main controller configured to control the plurality of actuators to dynamically move the first and second rails based on a stored profile of the shell bone while the shell bone is being moved along the first and second rails to achieve a desired rib rack cut with the saw blade.

12. The saw of claim 11, wherein the sticker chain assembly further comprises:
a first sticker chain configured to move the shell bone along the first rails; and
a second sticker chain configured to move the shell bone along the second rail.

13. The saw of claim 11, further comprising:
a sticker chain motor configured to drive the sticker chain assembly;
a chain counter to track the movement of the sticker chain assembly; and
a motor controller configured to reset the counter based on a sensed position of a shell bone, the motor controller further configured to communicate an output of the chain counter to the main controller, wherein the main controller uses at least in part the chain counter output in dynamically controlling the plurality of actuators that move the first and second rails.

14. The saw of claim 11, further comprising:
at least one sensor in communication with the main controller to determine at least one position of the item along the first and second rails.

15. The saw of claim 11, wherein the plurality of actuators further comprise:
a first actuator coupled to provide vertical movement of the first rail;
a second actuator coupled to provide vertical movement of the second rail; and
a third actuator coupled to provide horizontal movement of at least one of the first and second rails to dynamically adjust a gap between the first and second rails as the shell bone moves along the first and second rails.

16. The saw of claim 11, further including:
at least one orientation sensor configured to detect the orientation of the shell bone, the at least one orientation sensor in communication with the main controller, wherein the main controller uses an orientation signal from the at least one orientation sensor at least in part in dynamically controlling the plurality of actuators to move the first and second rails.

17. The saw of claim 16, wherein the at least one orientation sensor further comprises:
a first sensor;
a first deflection portion rotatably coupled under the first rail;
a first flag portion coupled to the first deflection portion, wherein the first flag portion activates the first sensor when the first deflection portion is moved by a rib portion of the shell bone;
a second sensor;
a second deflection portion rotatably coupled under the second rail; and
a second flag portion coupled to the second deflection portion, wherein the second flag portion activates the second sensor off when the second deflection portion is moved by a rib portion of the shell bone.

18. A saw system comprising:
a saw blade;
a first rail;
a second rail, the saw blade positioned proximate the first and second rails, the first and second rails configured and arranged to support a shell bone resting thereon and orientate the shell bone in relation to the saw blade;
a sticker chain configured to move the shell bone along the first and second rails to the saw blade;

at least one orientation sensor configured and arranged to sense the orientation of the shell bone supported by the first and second rails;

at least one first actuator coupled to move the first rail;

at least one second actuator coupled to move the second rail; and a controller in communication with the at least one orientation sensor, the controller further configured to activate the at least one first actuator and the at least one second actuator to move the first and second rails based at least in part on a signal from the orientation sensor and a location of the shell bone to dynamically adjust the position of the shell bone relative to the saw blade to achieve a desired cut of ribs.

19. The saw system of claim 18, further comprising:

a memory to store profiles, the controller in communication with the memory, the controller is further configured to activate the at least one first actuator and the at least one second actuator to move the first and second rails based at least in part on the stored profiles.

20. The saw system of claim 18, further comprising:

at least one timer coupled to the controller, the controller further configured to use timing information from the at least one timer in determining valid signals from the orientation sensor based on a length of time a signal from the orientation sensor is received.

21. The saw system of claim 18, further comprising:

at least one location sensor configured and arranged to detect a leading of the shell bone, the controller in communication with the at least one location sensor; and at least one chain counter in communication with the controller, the controller configured to determine the location of the shell bone based on the at least one location sensor and the at least one chain counter.

* * * * *